US012691735B2

(12) United States Patent
Nakamura et al.

(10) Patent No.: US 12,691,735 B2
(45) Date of Patent: Jul. 28, 2026

(54) AUTONOMOUS MOBILE BODY

(71) Applicant: TOYOTA JIDOSHA KABUSHIKI KAISHA, Toyota (JP)

(72) Inventors: Masashi Nakamura, Tokyo (JP); Masahiro Iwamoto, Nisshin (JP); Takao Kataoka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 18/588,298

(22) Filed: Feb. 27, 2024

(65) Prior Publication Data

US 2024/0286468 A1     Aug. 29, 2024

(30) Foreign Application Priority Data

Feb. 28, 2023     (JP) ................................. 2023-030331

(51) Int. Cl.
*B60J 3/04*          (2006.01)
*B60R 25/20*          (2013.01)
*B60W 60/00*          (2020.01)
*G07C 9/00*          (2020.01)

(52) U.S. Cl.
CPC ................. *B60J 3/04* (2013.01); *B60R 25/20* (2013.01); *B60W 60/00256* (2020.02); *G07C 9/00896* (2013.01)

(58) Field of Classification Search
CPC ..... B60J 3/04; B60R 25/20; B60W 60/00256; B60W 2540/043; B60W 60/0025; G07C 9/00896
See application file for complete search history.

(56) References Cited

U.S. PATENT DOCUMENTS

2019/0265702 A1    8/2019   Igata et al.
2020/0218281 A1    7/2020   Ono
2023/0126882 A1*   4/2023   Smith ................... B60W 30/08
                                                              701/23

FOREIGN PATENT DOCUMENTS

JP          H05-214861 A      8/1993
JP          2019-142703 A      8/2019
JP          2019-210607 A      12/2019
WO          2019/039014 A1      2/2019

* cited by examiner

*Primary Examiner* — Yuen Wong
(74) *Attorney, Agent, or Firm* — Oliff PLC

(57) ABSTRACT

An autonomous mobile body comprises a container apparatus where a plurality of sections can be separately locked and unlocked, where a window using a dimming glass is provided in a door of each of the plurality of sections; and a controller configured to cause movement to a predetermined location corresponding to a user who is a consignee of a first object, in a state where the dimming glass corresponding to a section where the first object is contained is made opaque, and cause the dimming glass of the section where the first object is contained to be transparent, in a case of successful authentication of the user.

5 Claims, 10 Drawing Sheets

VEHICLE 1

SERVER APPARATUS 2

CONTROLLER 21

CPU

RAM     ROM

STORAGE 22

PROGRAM

COMMUNICATION MODULE 23

INPUT/OUTPUT UNIT 24

FIG. 4

SERVER APPARATUS 2

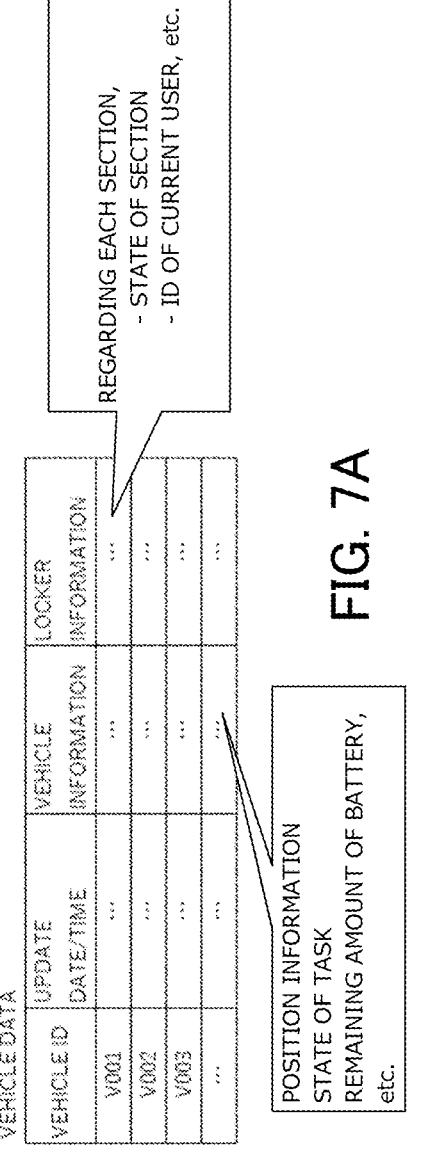

FIG. 7A

VEHICLE DATA

| VEHICLE ID | UPDATE DATE/TIME | VEHICLE INFORMATION | LOCKER INFORMATION |
|---|---|---|---|
| V001 | ⋯ | ⋯ | ⋯ |
| V002 | ⋯ | ⋯ | ⋯ |
| V003 | ⋯ | ⋯ | ⋯ |
| ⋯ | ⋯ | ⋯ | ⋯ |

REGARDING EACH SECTION,
- STATE OF SECTION
- ID OF CURRENT USER, etc.

POSITION INFORMATION
STATE OF TASK
REMAINING AMOUNT OF BATTERY,
etc.

FIG. 7B

TASK DATA

| VEHICLE ID | TYPE | DATE/TIME | TASK-RELATED INFORMATION |
|---|---|---|---|
| V001 | MOVEMENT | 11:45-12:00 | DESTINATION ID |
| | DEPOSITING | 12:00-12:15 | USER ID AND AUTHENTICATION INFORMATION |
| | MOVEMENT | 12:15-12:30 | DESTINATION ID |
| | WITHDRAWAL | 12:30-12:45 | USER ID AND AUTHENTICATION INFORMATION |
| | ⋯ | ⋯ | ⋯ |

AUTONOMOUS MOBILE BODY

CROSS REFERENCE TO THE RELATED APPLICATION

This application claims the benefit of Japanese Patent Application No. 2023-030331, filed on Feb. 28, 2023, which is hereby incorporated by reference herein in its entirety.

BACKGROUND

Technical Field

The present disclosure relates to a transport service for objects.

Description of the Related Art

There are attempts to provide services by dispatching autonomous vehicles designed for various uses. For example, Patent Literature 1 discloses an invention related to a system that allows depositing and withdrawal of luggage at various locations by operating an autonomous vehicle carrying lockers.

[Patent Literature 1] International Publication No. WO2019/039014

[Patent Literature 2] Japanese Patent Laid-Open No. 05-214861

[Patent Literature 3] Japanese Patent Laid-Open No. 2019-142703

[Patent Literature 4] Japanese Patent Laid-Open No. 2019-210607

SUMMARY

An object of the present disclosure is to increase convenience of a transport service.

The present disclosure in its one aspect provides an autonomous mobile body comprising: a container apparatus where a plurality of sections can be separately locked and unlocked, where a window using a dimming glass is provided in a door of each of the plurality of sections; and a controller configured to cause movement to a predetermined location corresponding to a user who is a consignee of a first object, in a state where the dimming glass corresponding to a section where the first object is contained is made opaque, and cause the dimming glass of the section where the first object is contained to be transparent, in a case of successful authentication of the user.

Furthermore, as another aspect, there may be cited a program for causing a computer to perform a method that is performed by the autonomous mobile body described above, or a non-transitory computer-readable storage medium storing the program.

According to the present disclosure, convenience of a transport service for objects may be increased.

BRIEF DESCRIPTION OF THE DRAWINGS

FIG. 4 is a diagram illustrating an example of a hardware configuration of a server apparatus 2;

FIGS. 7A and 7B are examples of vehicle data 22A and task data 22B;

DESCRIPTION OF THE EMBODIMENTS

Figure 1:
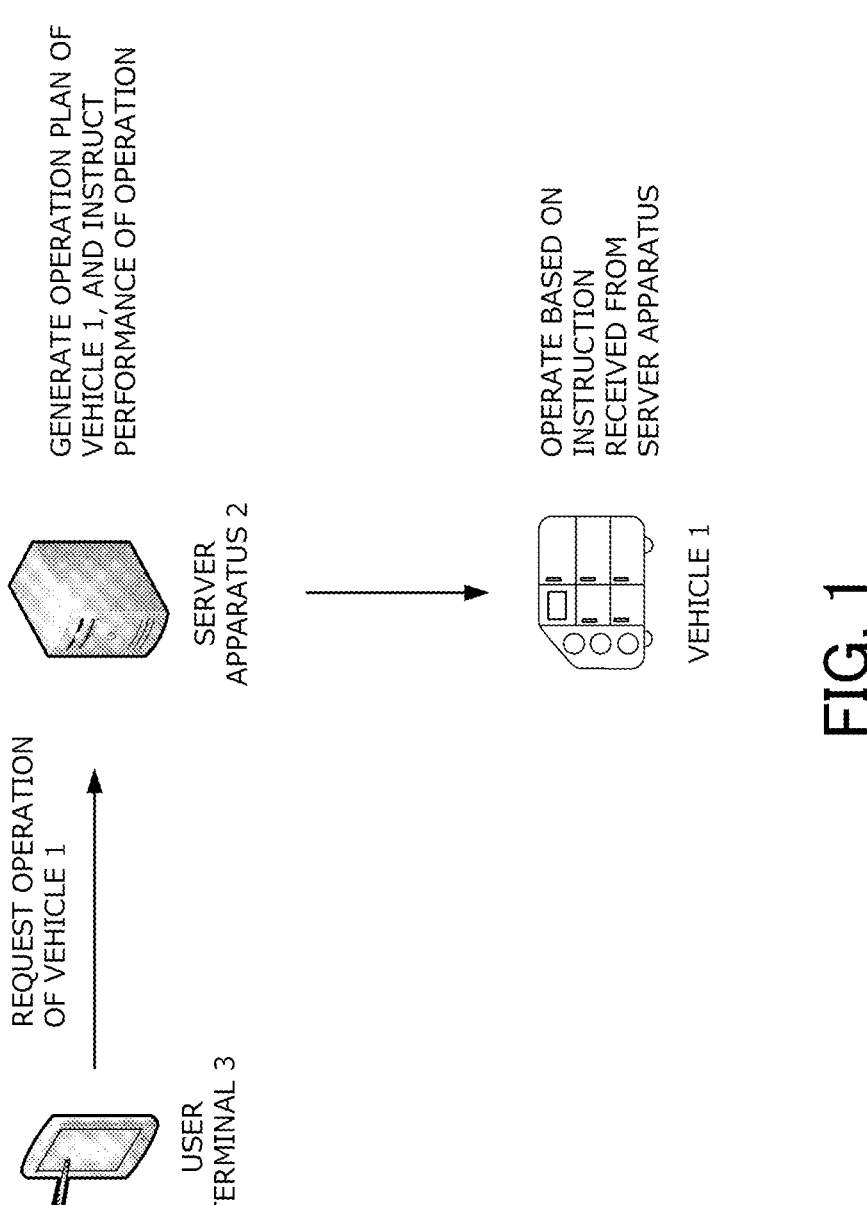
FIG. 1 is a schematic diagram of a delivery system according to a first embodiment.

There is proposed a system according to which a container apparatus capable of containing an object is mounted on a mobile body that is capable of traveling autonomously, and according to which the mobile body is dispatched to a user. For example, when an autonomous vehicle carrying a locker is dispatched to a specified location based on a request from a user terminal, a user is able to deposit a package without moving. Moreover, a product can be delivered, for example.

With a system that delivers an object by mounting a locker on an autonomous mobile body, generally, a section where an object is contained is locked at the time of departure and an unlocking operation is performed by a consignee after arrival.

However, with such a system, there may be a case where erroneous delivery is not satisfactorily handled.

For example, a consignee may notice that a wrong object is contained after unlocking the section where the object is contained. In this case, it is conceivable to return the object by re-locking the section. However, if the section is unlocked even once at a place away from an object owner, safety of the object cannot be guaranteed. This is especially true in the case where a delivery target is food, for example.

An autonomous mobile body according to the present disclosure solves such a problem.

An autonomous mobile body according to an embodiment includes a container apparatus where a plurality of sections can be separately locked and unlocked, where a window using a dimming glass is provided in a door of each of the plurality of sections, and a controller configured to cause movement to a predetermined location corresponding to a user who is a consignee of a first object, in a state where the dimming glass corresponding to a section where the first object is contained is made opaque, and cause the dimming glass of the section where the first object is contained to be transparent, in a case of successful authentication of the user.

The autonomous mobile body is typically an unmanned vehicle that moves autonomously while carrying a container apparatus (locker unit) that is capable of housing an object. The locker unit is a locker-type apparatus that includes a plurality of sections and that is capable of containing an object in each section. The plurality of sections may be separately locked. The locker unit mounted on the autonomous mobile body is also referred to as a mobile locker. By operating the autonomous mobile body where the locker unit is mounted, the locker may be dispatched to a location desired by a user and an object may be deposited. Furthermore, the object may be delivered between a plurality of users.

A window that uses a dimming glass is provided in the plurality of sections of the container apparatus. The dimming glass is a glass including a dimming element, and is a glass whose color or transmission state can be changed when an energization state is changed. For example, the dimming glass may be a glass that changes from being opaque to being transparent when a voltage is applied.

By using the dimming glass, switching between a transmissive state and a non-transmissive state is enabled. That is, switching can be performed between a state where inside of a section can be seen from outside and a state where the inside cannot be seen from outside.

The autonomous mobile body moves to a user who is a consignee of a first object while keeping the dimming glass corresponding to the section where the first object is contained in an opaque state. At this time, the first object cannot be seen from outside.

Furthermore, in the case where authentication of the user succeeds, the controller makes the dimming glass of the section where the first object is contained transparent. The user who is the consignee is thereby enabled to see the first object.

According to such a configuration, an object that is transported can be seen from outside before the door is unlocked. That is, in the case of erroneous delivery, such a state may be noticed before the door is unlocked. In the case of erroneous delivery, a procedure for return may be performed before the door is unlocked, for example, and safety of contents may thus be guaranteed.

Additionally, the controller may acquire an instruction from the user after making the dimming glass transparent, and may determine whether to unlock the section in question, based on the instruction. The instruction may be an instruction indicating whether to receive the first object or to reject reception of the first object.

In the case where reception of the first object is rejected, the controller may start to return the object without unlocking the section.

Furthermore, the controller may record, in a predetermined apparatus, a history of making the dimming glass transparent and a history of unlocking the section. The predetermined apparatus may be a main memory embedded in the autonomous mobile body, a server apparatus that manages the autonomous mobile body, or the like.

Whether or not it can be guaranteed that the contained object is in a safe state can thereby be determined in an ex-post manner.

Hereinafter, an embodiment of the present disclosure will be described with reference to the drawings. The configuration of the embodiment described below is an example, and the present disclosure is not limited to the configuration of the embodiment.

First Embodiment

An outline of a delivery according to a first embodiment will be described with reference to FIG. 1. The delivery system according to the present embodiment includes at least one vehicle 1 that performs autonomous traveling, and a server apparatus 2 that controls the vehicle 1. A user terminal 3 is a computer that issues a request to the server apparatus 2.

The vehicle 1 is an autonomous vehicle that travels based on an instruction from the server apparatus 2. The vehicle carries a container apparatus. The container apparatus is a locker-type apparatus that includes a plurality of sections, where an object can be housed in each section. The container apparatus may be in any mode as long as an object can be housed and a lock can be applied.

Figure 2:
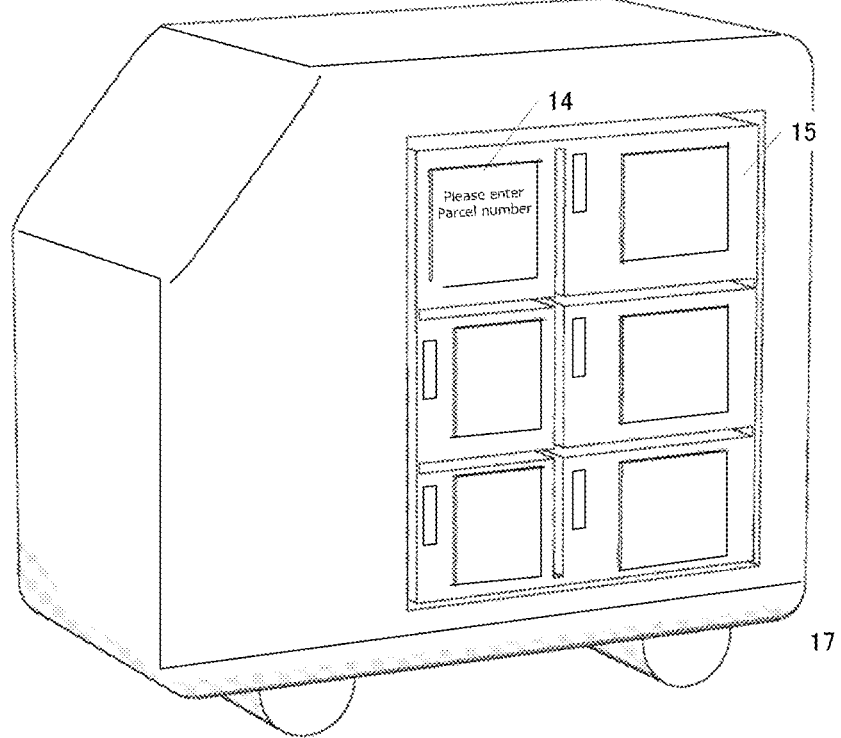
FIG. 2 is a diagram illustrating an external appearance of a vehicle 1.

FIG. 2 illustrates an external appearance of the vehicle 1. The vehicle 1 includes a drive unit 16 that is a unit that performs autonomous traveling, and a locker unit 15 where sections can be accessed through respective doors. The locker unit 15 includes a plurality of sections (five in the illustrated example).

A user using a service may perform an operation for unlocking a specified section by an input/output unit 14 provided on the vehicle 1.

The vehicle 1 provides a service of transporting an object (hereinafter "transport service") by using the locker unit 15 that is mounted. A user may deposit or withdraw an object at any location by calling the vehicle 1 via the server apparatus 2. Additionally, a user who deposits an object and a user who withdraws the object may be different. For example, a shop may deposit a product, and a consumer who purchased the product may receive the product at home.

The server apparatus 2 is an apparatus that manages operation of the vehicle 1.

As described, the vehicle 1 may move autonomously while carrying the locker unit 15. In the case where a dispatch request for a vehicle is received from the user terminal 3 carried by a user who is to put in or take out an object, the server apparatus 2 determines the vehicle 1 to be dispatched to the user, and instructs the vehicle 1 to perform operation.

The vehicle 1, the server apparatus 2, and the user terminal 3 are interconnected by a network. As the network, a wide area network (WAN), which is a worldwide public communication network such as the Internet, or other communication networks may be adopted, for example. Furthermore, the network may include a mobile communication network for mobile phones, or a wireless communication network such as Wi-Fi (registered trademark).

Next, details of the vehicle 1 and the server apparatus 2 will be given.

The vehicle 1 is a vehicle that performs autonomous traveling by being controlled by the server apparatus 2. More specifically, the vehicle 1 travels on a road by an appropriate method while sensing periphery thereof based on an operation instruction transmitted from the server apparatus 2. Furthermore, a predetermined task related to the transport service (such as reception or handing over of an object) is performed at a movement destination.

The server apparatus 2 is a computer that manages a plurality of vehicles 1. The server apparatus 2 is capable of performing wireless communication with the plurality of vehicles 1, and in a case where there is a request from a user, the server apparatus 2 determines the vehicle 1 that is to be dispatched to the user, and issues an instruction to perform operation to the vehicle 1.

<Hardware Configuration>

Figure 3:
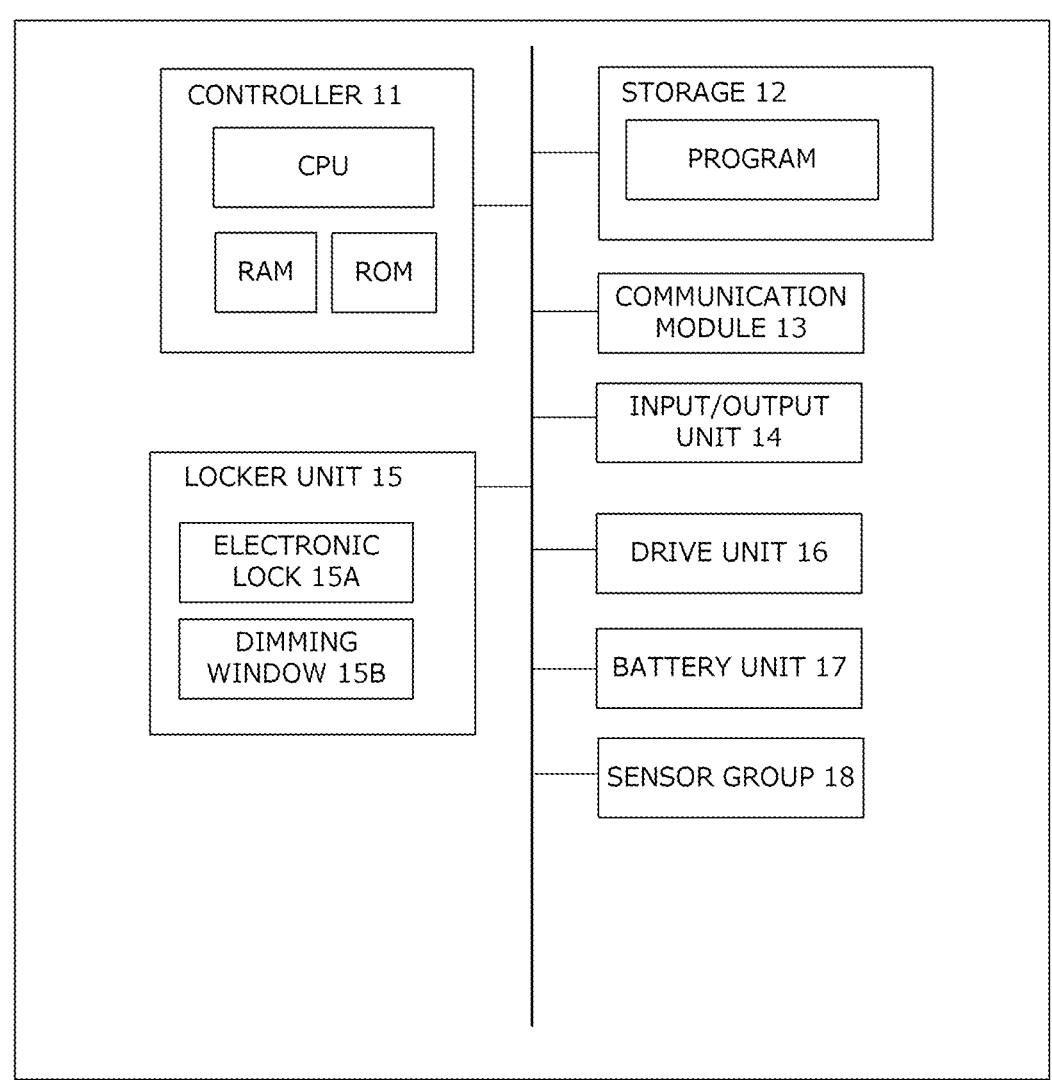
FIG. 3 is a diagram illustrating an example of a hardware configuration of the vehicle 1.

FIG. 3 is a diagram illustrating an example of a hardware configuration of the vehicle 1.

The vehicle 1 includes a controller 11, a storage 12, a communication module 13, an input/output unit 14, the locker unit 15, the drive unit 16, a battery unit 17, and a sensor group 18. The locker unit 15 and the drive unit 16 operate by electric power that is supplied from the battery unit 17.

The controller 11 is an arithmetic unit that implements various functions of the vehicle 1 by executing a predetermined program. For example, the controller 11 may be implemented by a hardware processor such as a CPU. Furthermore, the controller 11 may include a RAM, a read only memory (ROM), a cache memory, and the like.

The storage 12 is means for storing information, and is a storage medium such as a RAM, a magnetic disk, or a flash memory. The storage 12 stores programs to be executed by the controller 11, data to be used by the programs, and the like.

The communication module 13 is communication means for connecting the vehicle 1 to the network. In the present embodiment, the vehicle 1 is capable of communicating with another apparatus (such as the server apparatus 2) via the network by using a mobile communication service such as 3G, LTE, or 5G. Additionally, the communication module 13 may further include communication means for performing inter-vehicle communication with another vehicle.

The input/output unit 14 is means for receiving an input operation performed by a user, and for presenting information to the user. More specifically, the input/output unit 14 includes a device for performing input, such as a mouse or a keyboard, and a device for performing output, such as a display or a speaker. For example, the input/output unit 14 may be integrally formed by a touch panel display.

The locker unit 15 is a locker-type apparatus that includes a plurality of sections, and that allows an object to be housed in each section. As described with reference to FIG. 2, the locker unit 15 is formed such that the sections may be independently accessed through respective doors. The locker unit 15 includes a plurality of electronic locks 15A, and the plurality of sections may thereby be locked/unlocked.

The plurality of sections of the locker unit 15 each include a dimming window 15B. The dimming window 15B includes a dimming glass. The dimming window 15B is provided in a door of a corresponding section, and the dimming glass may be switched between a transparent state and an opaque state.

Furthermore, the locker unit 15 is connected to the controller 11, and operation thereof (such as authentication of a user, locking/unlocking, switching of the window between the transparent state and the opaque state, and the like) is controlled by the controller 11. Furthermore, the locker unit 15 may perform interaction with the user via the input/output unit 14.

Additionally, the locker unit 15 may include a unit (such as a refrigeration unit) for cooling or warming inside of the section.

The drive unit 16 is means for causing the vehicle 1 to travel, based on an instruction generated by the controller 11. For example, the drive unit 16 may include a motor, an inverter, a brake, and a steering mechanism for driving wheels. The drive unit 16 is coupled with the battery unit 17, and is operated by the electric power supplied by the battery unit 17. The battery unit 17 can typically be a secondary battery such as a lithium-ion battery or a nickel-metal hydride battery.

The sensor group 18 includes a plurality of sensors that perform sensing of periphery of the vehicle, and typically includes a camera, a laser scanner, a LIDAR, a radar, a GPS module, and the like. Information acquired by a sensor included in the sensor group 18 is transmitted to the controller 11. The sensor group 18 may include a camera that is provided in the vehicle 1. For example, there may be included an image capturing device that uses an image sensor such as a charged-coupled devices (CCD), a metal-oxide-semiconductor (MOS), or a complementary metal-oxide-semiconductor (CMOS).

Figure 4:
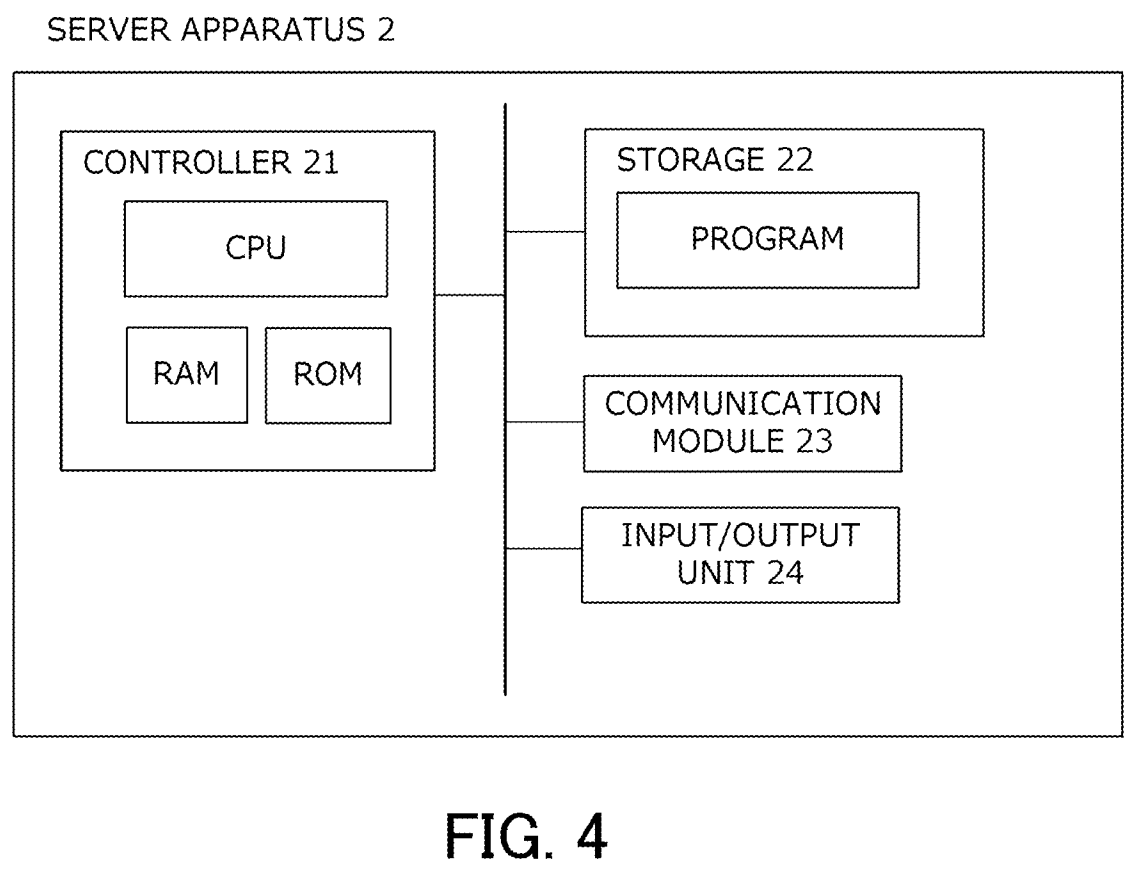

FIG. 4 is a diagram illustrating an example of a hardware configuration of the server apparatus 2.

The server apparatus 2 is a computer including a controller 21, a storage 22, a communication module 23, and an input/output device 24.

The server apparatus 2 may be a computer including processors (CPU, GPU, and the like), main memories (RAM, ROM, and the like), and auxiliary memories (EPROM, hard disk drive, removable medium, and the like). An auxiliary memory stores an operating system (OS), various programs, various tables and the like, and each function (software module) matching a predetermined objective as described later may be implemented by executing a program stored in the auxiliary memory. Additionally, at least one or all the functions may alternatively be implemented as a hardware module by a hardware circuit such as an ASIC or an FPGA.

The controller 21 is an arithmetic unit that implements various functions of the server apparatus 2 by executing a predetermined program. For example, the controller 21 may be implemented by a hardware processor such as a CPU. Furthermore, the controller 21 may include a RAM, a read only memory (ROM), a cache memory, and the like.

The storage 22 is means for storing information, and is a storage medium such as a RAM, a magnetic disk, or a flash memory. The storage 22 stores programs to be executed by the controller 21, data to be used by the programs, and the like.

The communication module 23 is a communication interface for connecting the server apparatus 2 to the network. For example, the communication module 23 may include a network interface board, a wireless communication interface for wireless communication, and the like.

The input/output device 24 is means for receiving an input operation performed by an operator, and for presenting information to the operator. More specifically, the input/output device 24 includes a device for performing input, such as a mouse or a keyboard, and a device for performing output, such as a display or a speaker. For example, the input/output unit may be integrally formed by a touch panel display.

Additionally, with respect to specific hardware configurations of the vehicle 1 and the server apparatus 2, structural elements may be omitted, replaced, or added as appropriate depending on the embodiment. For example, the controller 11 or the controller 21 may include a plurality of hardware processors. The hardware processors may include a microprocessor, an FPGA, a GPU, and the like. The input/output device 24 may be omitted, or an input/output device other than the one illustrated (such as an optical drive) may be added. Furthermore, the server apparatus 2 may be formed from a plurality of computers. In this case, hardware configurations of the computers may be the same or different.

The user terminal 3 is a computer that is used by a user who uses the object transport service. For example, the user terminal 3 may be a computer that is used by an individual, such as a personal computer, a smartphone, a mobile phone, a tablet computer, or a personal digital assistant. The user may access the server apparatus 2 via a web browser or application software operating on the user terminal 3, and may interact with the server apparatus 2. A hardware configuration of the user terminal 3 is the same as that of the server apparatus 2, and description thereof will be omitted.

<Software Configuration>

Next, a software configuration of each device forming the vehicle 1 and the server apparatus 2 will be described.

Figure 5:
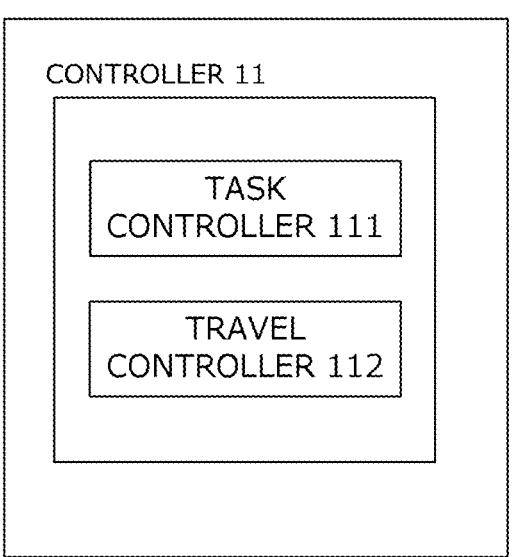
FIG. 5 is a diagram schematically illustrating a software configuration of the vehicle 1.

FIG. 5 is a diagram schematically illustrating a software configuration of the vehicle 1 according to the present embodiment. In the present embodiment, the controller 11 includes two software modules, namely, a task controller 111 and a travel controller 112. Each software module may be implemented by executing a program stored in the storage 12 by the controller 11 (CPU).

The task controller 111 performs a plurality of tasks for providing the service to a user, based on an instruction transmitted from the server apparatus 2. The tasks include a task of moving to a predetermined location, a task of receiving an object from a user, and a task of handing over the deposited object, for example. These tasks may include a plurality of subtasks. For example, the task of handing over an object may include a task of authenticating a target user, and a task of unlocking a predetermined section of the locker unit 15. Information about a task to be performed by the task controller 111 may be stored in the storage 12, and may be referred to by the travel controller 112 described later.

In the case where the task to be performed by the vehicle 1 is related to movement, the task controller 111 determines a travel route and a destination of the vehicle 1, and instructs the travel controller 112 to perform movement. For this purpose, the task controller 111 may be capable of acquiring road map data.

Furthermore, in the case where the task to be performed by the vehicle 1 is related to transfer of an object, the task controller 111 identifies the user who is to put in or take out the object and the section where the object is contained, and controls the electronic lock 15A corresponding to the section. For example, the task controller 111 may perform a process of acquiring authentication information from the user via the input/output unit 14 and authenticating the user, and a process of unlocking the corresponding section in the case of successful authentication. At this time, the task controller 111 may perform interaction with the user, and may switch the state (transparent/opaque) of the window based on the result.

Furthermore, the task controller 111 regularly transmits data indicating a status of itself (hereinafter "status data") to the server apparatus 2.

For example, the status data includes the following information.

Identifier of the vehicle 1

Current position of the vehicle 1

Information about tasks completed until now

Information about remaining tasks

Remaining amount (SOC) of the battery unit 17 or mileage

Information about the operation route (if during operation)

Information about an object contained in the locker unit 15

The server apparatus 2 may update data about the vehicle based on the received status data.

The travel controller 112 performs control of causing the vehicle 1 to travel autonomously. The travel controller 112 may detect an environment surrounding the vehicle based on data acquired by the sensors included in the sensor group 18, and may control autonomous traveling of the vehicle by using position information of the subject vehicle, the road map data, and the like. Targets of detection include, but are not limited to, number and positions of lanes, number and positions of vehicles present in the periphery of the subject vehicle, number and positions of obstacles (such as pedestrians, bicycles, structures, buildings, etc.) present in the periphery of the subject vehicle, a structure of the road, road signs, and the like. A target of detection may be anything that is necessary to perform autonomous traveling.

The travel controller 112 causes the subject vehicle to travel along a predetermined route while not allowing an obstacle to enter a predetermined safety region around the subject vehicle. A known method may be used as the method of causing the vehicle to travel autonomously.

Figure 6:
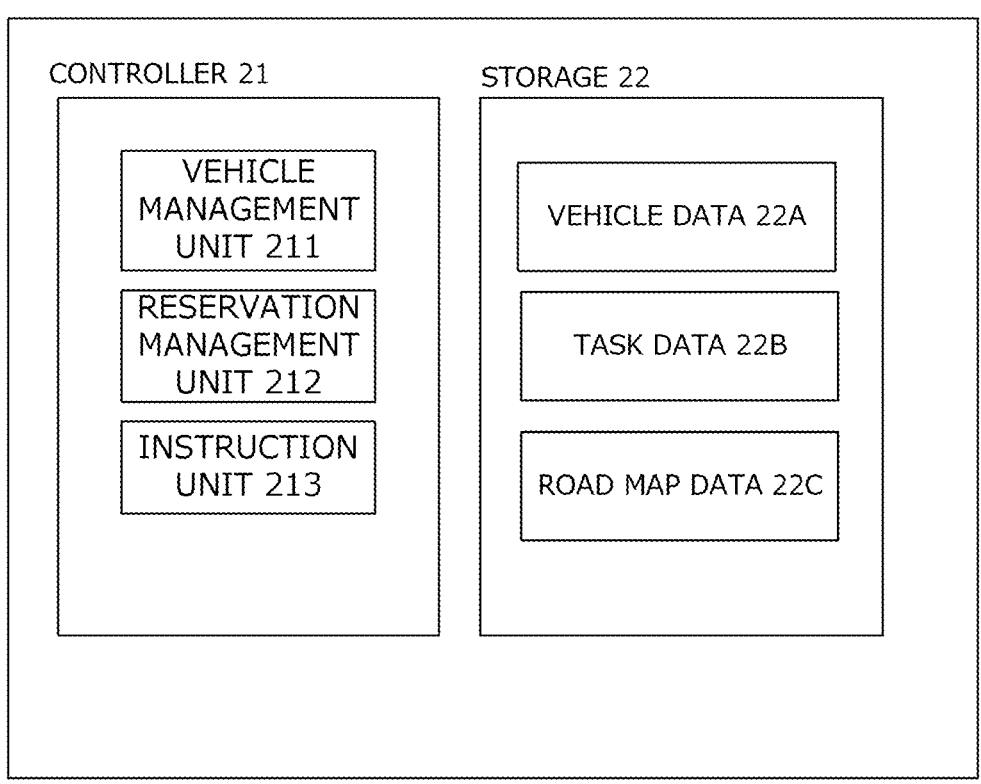
FIG. 6 is a diagram schematically illustrating a software configuration of the server apparatus 2.

FIG. 6 is a diagram schematically illustrating a software configuration of the server apparatus 2 according to the present embodiment. In the present embodiment, the controller 21 includes three software modules, namely, a vehicle management unit 211, a reservation management unit 212, and an instruction unit 213. Each software module may be implemented by execution of a program stored in the storage 22 by the controller 21 (CPU).

The vehicle management unit 211 collects information about the vehicle 1, and updates a vehicle database structured in the storage 22. The vehicle database is a database managing information about the vehicle 1 that is being managed by the system. The vehicle management unit 211 regularly performs communication with a plurality of vehicles 1, and collects the status data described above. The collected data is reflected in the vehicle database described later.

The reservation management unit 212 receives, from the user terminal 3, a request to perform delivery of an object (that is, a request for dispatch of the vehicle 1; in the following, "vehicle dispatch request"). Additionally, the reservation management unit 212 may perform a service (a web service or the like) for receiving the vehicle dispatch request by performing interaction with the user terminal 3.

The vehicle dispatch request includes information indicating locations of depositing and withdrawing an object, dates/times of depositing and withdrawal, and a temperature range in which the object is maintained, for example. The temperature range may be ranges such as "normal temperature", "cold-storage", and "freezer", or may specify a specific temperature (such as "0 degrees C. to 4 degrees C.").

Additionally, the vehicle dispatch request may request one of depositing and withdrawal of an object, or may simultaneously request both. In the case of simultaneously requesting both, the vehicle dispatch request may include location and date/time of depositing, and location and date/time of withdrawal.

In the case where the vehicle dispatch request is received, the reservation management unit 212 determines dispatch destination and schedule of the vehicle 1 based on the vehicle dispatch request, and generates an operation instruction for the vehicle 1.

The operation instruction is data instructing the vehicle 1 as to tasks to be executed.

For example, the tasks are a task of moving to a predetermined location, a task of receiving an object from a user, and a task of handing over the object to a user.

When the reservation management unit 212 generates an operation instruction including a plurality of tasks, and the vehicle 1 sequentially completes the tasks according to the operation instruction, the service by the mobile locker may be provided.

In the case where a task is related to movement, a destination and a schedule may be associated with the task. The vehicle 1 may operate according to the specified schedule, through the specified destination.

Furthermore, in the case where a task is related to depositing or withdrawal of an object, the reservation management unit 212 may generate authentication information to be used for user authentication. For example, the reservation management unit 212 may generate first authentication information and second authentication information to be checked against the first authentication information, and may transmit the first authentication information to the vehicle 1, in association with the task. Furthermore, the second authentication information may be transmitted to the user terminal 3. The first authentication information is stored by the vehicle 1. Furthermore, the second authentication information is input to the vehicle 1 by the user. The vehicle 1 may confirm legitimacy of the user by performing user authentication by checking the two against each other.

Additionally, at the time of generating the operation instruction, the reservation management unit 212 desirably determines whether the service can be provided or not, by taking into account the remaining amount of battery of the target vehicle (the battery unit 17). More specifically, provision of the service may be determined to be possible in a case where traveling to a location specified by the user is possible.

In the case where the service cannot be provided, methods as below may be adopted.

(Method 1) Use a Substitute Vehicle.

A substitute vehicle may be prepared if an object is not yet received from the user.

(Method 2) Propose Charging of Battery.

In the case where the remaining amount of the battery unit 17 is not sufficient, it is possible to propose charging of the corresponding vehicle.

(Method 3) Propose Re-Placement of Object.

In the case where an object is already received from the user and the remaining amount of the battery unit 17 is not sufficient, it is possible to propose re-placing the object on a substitute vehicle.

The instruction unit 213 transmits the generated operation instruction to the target vehicle 1. The vehicle 1 performs a task according to the operation instruction transmitted from the server apparatus 2, and provides the service to the user.

The storage 22 stores vehicle data 22A, task data 22B, and road map data 22C.

The vehicle data 22A is data recording a status of the vehicle 1 that is being managed by the server apparatus 2. FIG. 7A is an example of the vehicle data 22A. The vehicle data 22A includes fields of identifier of the vehicle, update date/time, vehicle information, and locker information.

The vehicle information field stores data indicating a current state of the vehicle 1. More specifically, the vehicle information field stores position information of the vehicle 1, information about a task completed by the vehicle 1 before a current time point, information about a task that is to be performed by the vehicle 1, the remaining amount of battery and mileage of the vehicle 1, and the like.

The locker information field stores data about a state of the locker unit 15. More specifically, the locker information field stores a state (available or used) of each section of the locker unit 15, a set temperature, an identifier of a user who uses each section, and the like.

The vehicle data 22A is regularly updated by the status data transmitted from the vehicle 1.

The task data 22B is data recording a plurality of tasks generated by the reservation management unit 212.

FIG. 7B is an example of the task data 22B. The task data 22B includes an identifier of the vehicle, the type of a task, date/time when the task is performed, task-related information, and the like. The type of a task is "movement", "depositing", "withdrawal", or the like, for example.

The task-related information is a collection of additional information for performing a task. In the case where a task is related to movement, the task-related information may record an identifier of the destination or a movement route.

Furthermore, in the case where a task is related to depositing or withdrawal of a package, the task-related information may record an identifier of a user, and authentication information for authenticating the user.

The vehicle 1 provides the service to the user by sequentially performing the tasks included in the operation instruction transmitted from the server apparatus 2.

In the illustrated example, it is indicated that a vehicle with an identifier V001 performs the following.

(1) Move to a predetermined location between 11:45 and 12:00.

(2) Receive an object from the user between 12:00 and 12:15.

(3) Move to a predetermined location between 12:15 and 12:30.

(4) Hand over the object to the user between 12:30 and 12:45.

The road map data 22C is a database storing data about a road network where the vehicle 1 travels. The road map data 22c stores a definition of a plurality of road segments, position information of each road segment, connection relationships, and the like. A road segment is obtained by dividing a road where the vehicle 1 is able to travel into predetermined unit sections. These data pieces are used at the time of determining a dispatch location of the vehicle 1.

Next, a method of providing the transport service by the delivery system according to the present embodiment will be described.

Figure 8:
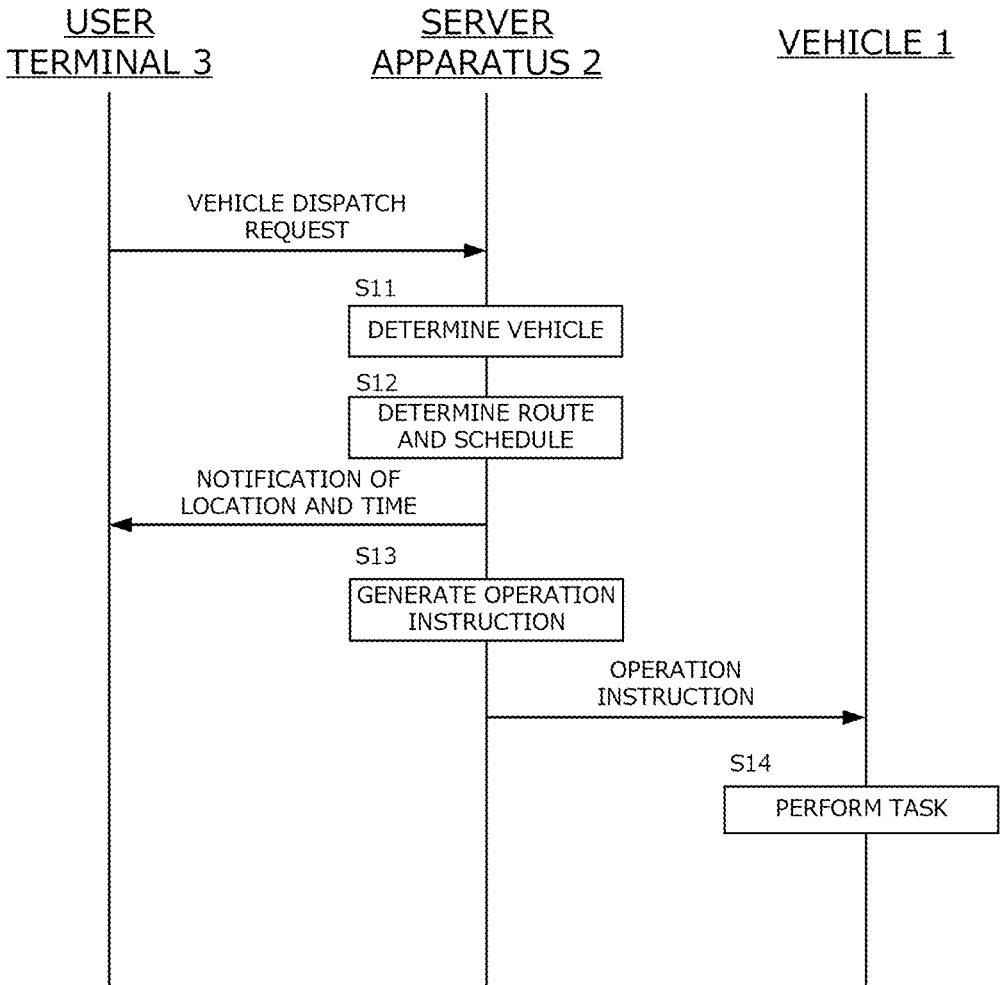
FIG. 8 is a sequence diagram of processes that are performed by structural elements included in the system.

FIG. 8 is a sequence diagram of processes that are performed by the structural elements included in the system.

Additionally, during operation, the vehicle 1 regularly generates the status data, and transmits the same to the server apparatus 2. The status data includes, in addition to the state of the vehicle 1, information about a task that is completed before a current time point, information about an object that is contained in the locker unit 15, and the like. The server apparatus 2 (the vehicle management unit 211) receiving the status data updates the vehicle data 22A based on the status data received. At a timing of start of the processing illustrated in FIG. 8, it is assumed that the latest vehicle data 22A is held by the server apparatus 2 based on the status data collected from a plurality of vehicles 1 being managed.

A user who wants to deposit/withdraw an object accesses the server apparatus 2 through the user terminal 3, and issues the vehicle dispatch request. The vehicle dispatch request includes information related to a location where the object is to be deposited, a location as a delivery destination of the object, a desired time slot, a temperature range in which the object is to be kept, and the like. For example, the vehicle dispatch request may be generated by accessing a web server provided by the controller 21 (the reservation management unit 212), by using a web browser executed on the user terminal 3. For this purpose, the reservation management unit 212 may generate a user interface to be provided to the user terminal 3.

In step S11, the controller 21 (the reservation management unit 212) determines the vehicle 1 to be dispatched to the user, based on the vehicle dispatch request received from the user terminal 3. The vehicle 1 to be dispatched to the user is determined by referring to contents of the vehicle dispatch request and the vehicle data 22A. More specifically, the vehicle 1 that can be dispatched to a specified area in a specified time slot is determined to be the dispatch target.

In step S12, the controller 21 (the reservation management unit 212) determines the operation route and the schedule for the vehicle 1 determined in step S11.

Figure 9:
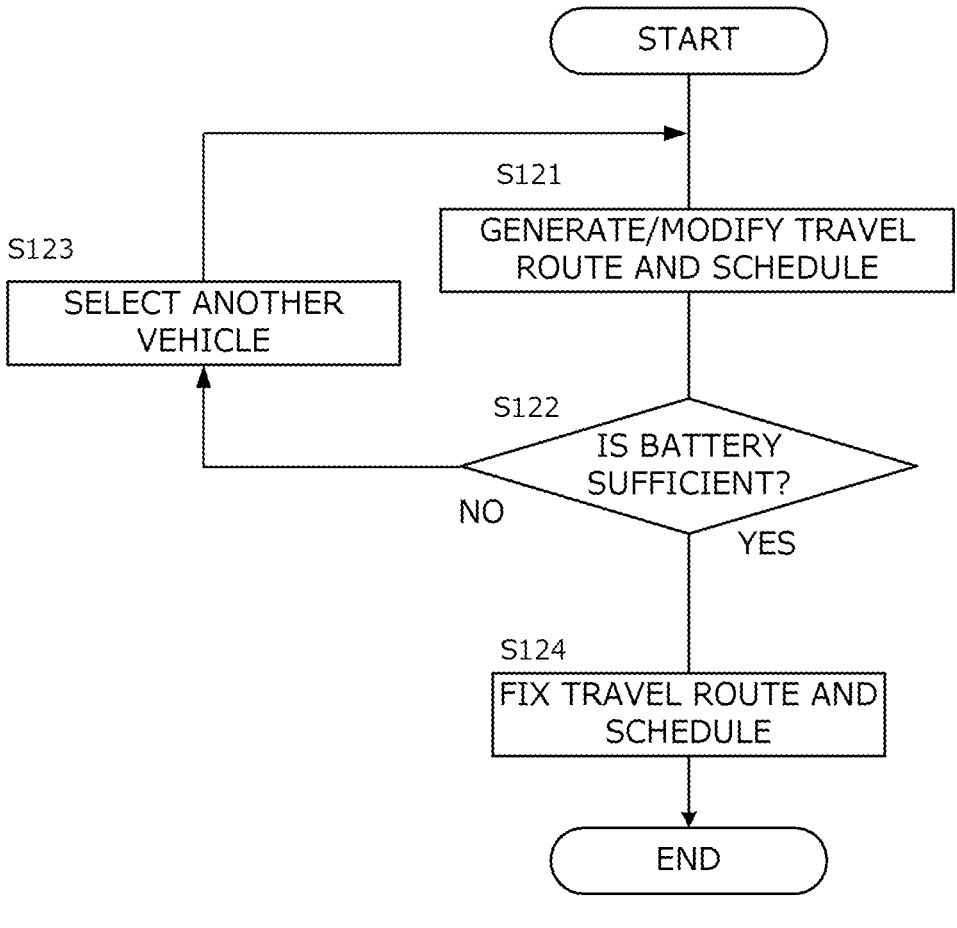
FIG. 9 is a flowchart of processes that are performed by a controller 21 in step S12.

FIG. 9 is a flowchart illustrating in detail processes that are performed by the controller 21 (the reservation management unit 212) in step S21.

First, in step S121, the travel route and the schedule are generated. The travel route and the schedule generated here are provisional and are for evaluation. Additionally, in the case where the target vehicle 1 is being operated, the route and the schedule associated with the operation are modified.

In step S122, whether the remaining amount of battery is sufficient, or in other words, whether the specified location can be reached with the current remaining amount of battery, is determined.

In the present step, the amount of electric power that is consumed on the route for delivering the object is calculated, and whether the calculated amount of electric power can be supplied by the battery unit 17 is determined.

In the case where it is determined that the amount of electric power for traveling cannot be supplied, the process proceeds to step S123, and another vehicle is selected. In the case where it is determined that the amount of electric power for traveling can be supplied, the process proceeds to step S124.

In step S124, the operation route and the schedule generated in step S121 are formally fixed.

A description will be further given by referring back to FIG. 8.

When the operation route and the schedule are determined in step S12, the server apparatus 2 notifies the user terminal 3 of the location and date/time of arrival of the vehicle 1. Then, the controller 21 (the instruction unit 213) generates an operation instruction for causing the target vehicle to perform a task, and transmits the same. The vehicle 1 receiving the operation instruction performs the specified task (step S14).

Figure 10:
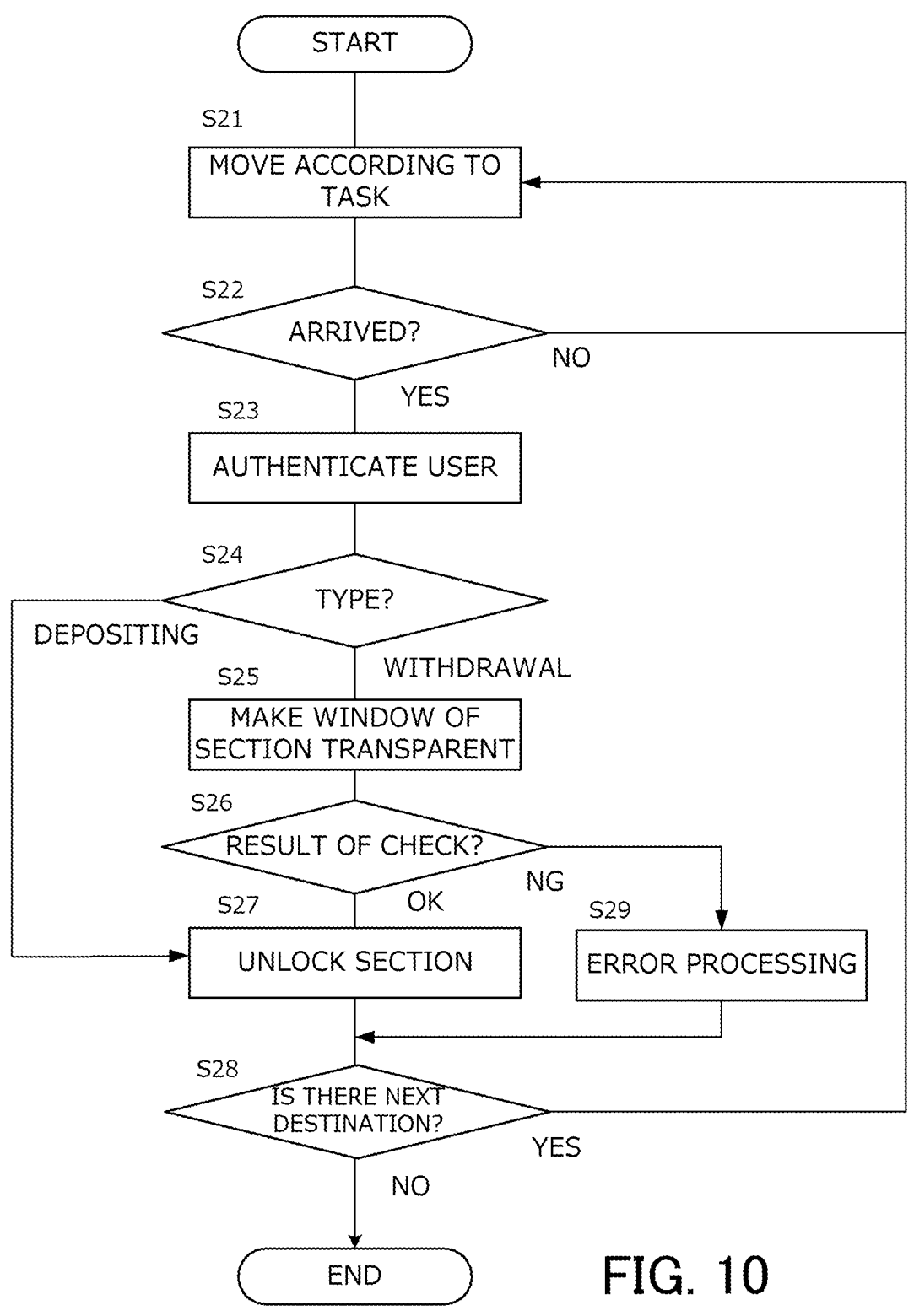
FIG. 10 is a flowchart of processes that are performed by the vehicle 1 that received an operation instruction.

FIG. 10 is a flowchart of processes that are performed by the vehicle 1 that received an operation instruction. The vehicle 1 that received an operation instruction performs a task based on the operation instruction. Here, the vehicle 1 is assumed to perform a series of tasks from reception of an object to handing over of the same.

First, in step S21, the vehicle 1 (the controller 11) starts to travel toward a destination that is specified by the task.

When the vehicle 1 arrives at the destination (step S22: Yes), the controller 11 performs authentication of a user from whom an object is to be received ("depositing" from the standpoint of the user) or to whom the object is to be handed over ("withdrawal" from the standpoint of the user) (step S23).

Additionally, after arrival of the vehicle 1, the controller 11 may transmit a message to a mobile terminal or the like carried by the user to call over the user.

In the present step, the controller 11 acquires the second authentication information via the input/output unit 14, and checks the same against the first authentication information stored in the storage 12. The second authentication information may be acquired in the form of text data via a keyboard or a touch panel, or may be acquired in the form of image data via a camera or a scanner, or may be acquired via wireless communication. Furthermore, in the case where IC card information is registered in advance, the IC card information may be read using a card reader or the like, and successful authentication may be determined in a case where information that is registered in advance is matched.

In step S24, the controller 11 determines whether depositing of an object or withdrawal of an object is to be performed. In the case where depositing of an object is to be performed, the process proceeds to step S27, and the controller 11 unlocks the electronic lock of the corresponding section. Additionally, when an object is deposited, the dimming glass of the corresponding section may be switched to the opaque state at the timing.

In the case where withdrawal of an object is to be performed, the process proceeds to step S25.

In step S25, the controller 11 controls the dimming window 15B of the section where the object is contained, and switches the dimming glass to the transparent state.

Next, in step S26, the controller 11 acquires from the user, via the input/output unit 14, information about whether the object that is contained is the correct object or not. When a positive response is obtained from the user, the process proceeds to step S27, and the controller 11 unlocks the electronic lock of the corresponding section. In the case where a negative response is obtained from the user, the process proceeds to step S29, and error processing is performed.

The error processing is a process that is performed in a case where the object cannot be handed over to the user. The error processing is a process that is performed in a case where the object to be sent to the user is not contained or in a case where a wrong object is contained, for example. As the error processing, a procedure of returning the object that is sent by mistake may be cited as an example.

In the case where an object is deposited or withdrawn, related information is notified to the server apparatus 2 by the status data that is regularly transmitted by the vehicle 1.

Additionally, the status data may include, with respect to a predetermined section, "history of making the dimming glass transparent" and/or "history of unlocking". For example, such an event may be included in the status data in association with a timestamp.

An administrator of the system may thus determine, with respect to a predetermined section, that "the dimming glass was made transparent, and then, the section was unlocked", or "the dimming glass was made transparent, and then, the object was returned without the section being unlocked".

Accordingly, for example, in the case where the returned object is food, whether the food is kept in a safe state or not (for example, "it is safe because unlocking is not performed after shipment") may be determined.

Next, the controller 11 determines whether there is a next destination or not, based on the operation instruction (step S28), and in the case where there is a next destination, operation is continued. In the case where there is no next destination, return to a predetermined site is performed.

As described above, with the container apparatus mounted on the vehicle 1 according to the present embodiment, a window that uses a dimming glass is provided in the door of each section. Furthermore, by dynamically changing a transmission state of the dimming glass, erroneous delivery may be coped with while protecting privacy.

(Modification)

The embodiment described above is merely an example, and the present disclosure may be modified as appropriate within the scope of the present disclosure.

For example, processes and means described in the present disclosure may be freely combined to the extent that no technical conflict exists.

Furthermore, in the description of the embodiment, a locker-type apparatus including a plurality of sections is illustrated, but the apparatus to be mounted on the vehicle 1 does not have to be the locker-type apparatus as long as an object can be housed and kept.

Furthermore, in the description of the embodiment, a mode in which a product to be sold to a user is delivered by the locker unit 15 is described as an example, and settlement of payment for the product may be performed at the vehicle 1 at the time of delivery of the product. For this purpose, the locker unit 15 may further include a settlement unit for receiving electronic payment. The settlement unit is a device that includes an IC card reader, an NFC reader, a barcode reader or the like, and that receives payment for a product based on information that is read (electronic money information, credit card information). The device transmits information that is read to a settlement server.

In the case of the mode, the server apparatus 2 may acquire, by the vehicle dispatch request, settlement-related information (such as information for identifying a seller of a product, information specifying price of the product). Furthermore, tasks generated based on the vehicle dispatch request may include a task "receive payment for a product". Moreover, the task of handing over an object to the user may be performed after completion of the settlement task.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD)

and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An autonomous mobile body comprising:

a container apparatus where a plurality of sections are separately locked and unlocked, where a window using a dimming glass is provided in a door of each of the plurality of sections; and a controller, including a processor, configured to:

cause movement of the autonomous mobile body to a predetermined location corresponding to a user who receives or rejects a first object, in a state where the dimming glass corresponding to a section where the first object is contained is made opaque, and cause the dimming glass of the section where the first object is contained to be transparent, in a case of successful authentication of the user.

2. The autonomous mobile body according to claim 1, wherein the controller acquires an instruction from the user after making the dimming glass transparent, and determines whether to unlock the section, based on the instruction.

3. The autonomous mobile body according to claim 2, wherein the instruction is an instruction indicating whether to receive the first object or to reject reception of the first object.

4. The autonomous mobile body according to claim 1, wherein the controller records, in a predetermined apparatus, a history of making the dimming glass transparent and a history of unlocking the section.

5. The autonomous mobile body according to claim 1, wherein the dimming glass is a glass that changes from an opaque state to a transparent state due to application of a voltage.

* * * * *